United States Patent [19]
Ogawa et al.

[11] 4,084,895
[45] Apr. 18, 1978

[54] PROJECTION DEVICE FOR A PHOTOCOPYING MACHINE

[75] Inventors: Masaya Ogawa, Osaka; Hiroshi Murasaki, Sakai, both of Japan

[73] Assignee: Minolta Camera Kabushiki Kaisha, Japan

[21] Appl. No.: 740,722

[22] Filed: Nov. 10, 1976

[30] Foreign Application Priority Data

Nov. 28, 1975 Japan .................. 50-143231

[51] Int. Cl.² ........................................... G03B 27/00
[52] U.S. Cl. ....................................... 355/1; 354/197; 355/8; 355/50
[58] Field of Search ............... 355/55, 1, 8, 50, 51, 355/3 R, 25, 63; 354/197

[56] References Cited

U.S. PATENT DOCUMENTS

| | | | |
|---|---|---|---|
| 3,476,478 | 11/1969 | Rees, Jr. | 355/55 |
| 3,882,520 | 5/1975 | Kamp et al. | 354/197 |
| 3,955,888 | 5/1976 | Kakiuchi et al. | 355/1 |

*Primary Examiner*—Richard A. Wintercorn
*Attorney, Agent, or Firm*—Wenderoth, Lind & Ponack

[57] ABSTRACT

The present invention is a projection device for a photocopying machine in which the original documents are moved during the photocopying process and which permits photocopying both of thick and of thin original documents. The projection means includes a focussing means which has a short focal length and is positioned to correctly focus the image of thin original documents which are brought to an exposure station and are only separated space-wise from the focussing means onto a photosensitive material, and a transparent block which, when a thick original document is copied, is automatically interposed between the focussing means and the exposure station and compensates the deviation in the path of image-wise light caused by the transparent carrier on which the thick original document is supported, whereby good resolution is achieved in photocopies of all types of original documents.

10 Claims, 6 Drawing Figures

PROJECTION DEVICE FOR A PHOTOCOPYING MACHINE

The present invention relates to an optical projection device for a photocopying machine in which an original document is moved during the photocopying process. More particularly the invention relates to an optical projection means making it possible to achieve good resolution for all photocopies in a photocopying machine for production of photocopies both of thin original documents and of thick original documents.

In the field of photocopying it is considered convenient to provide a dual-purpose photocopying machine which may produce photocopies both of thin original documents, for example in the form of single sheets of paper, and of thick original documents, for example in the form of pages of a book, in order to avoid the expense and space requirements of separate photocopying machines for thin and thick original documents. When a thick original document is copied the reverse side of the document is protected from external light by the other pages, etc., to which the document being copied is attached, and also the document is held naturally in position for photocopying by the weight of the other attached pages, etc. On the other hand, when a thin original document is copied it is necessary to employ means for positioning and holding the original document in the required manner and also to protect the original document from external light, in order to avoid excessive illumination of the document during photocopying thereof.

In a photocopying machine in which an original document is moved during the photocopying process, there is employed for example a rotator drum having a periphery which is made of photosensitive material, and successive portions of which are exposed to the imagewise light reflected from successive portions of the original document brought to an exposure station and directed onto the photosensitive drum by a focussing lens or similar means, as the drum rotates and the original document is moved, the photosensitive drum subsequently transferring an image of the original document to a sheet of copy paper, whic is then processed in a suitable manner and forwarded to the exit of the photocopying machine. In a dual-purpose photocopying machine employing such means, during photocopying of a thin original document the document is moved past the exposure station while gripped between forwarding rolls and follower rolls, the follower rolls being provided on the inner side of a movable opaque cover which is currently positioned over the exposure station. When a thick original document is photocopied, the opaque cover is removed, and the original document is supported on a transparent carrier which rides on and is moved by the forwarding rolls to bring successive portions of the original document into line with the exposure station.

Designating the refractive index of the material of the transparent carrier as $n1$, and the thickness in millimeters thereof as $t$, when a thick original document is photocopied the length of the optical path from the surface of the original document to the focussing lens or similar means constituting part of a projection means and located intermediate the exposure station and the photosensitive drum is $t/n1$ millimeters longer than when a thin original document is photocopied, since the surface of a thick original document is separated from the line of the forwarding rolls by the transparent carrier, whereas a thin original document is positioned actually on the line of the forwarding rolls during the photocopying process. In conventional equipment this has had the disadvantage that the focussing means of the projection means can be set to obtain maximum sharpness of images in photocopies either of thin original documents or of thick original documents, but not of both and it has therefore not been possible to obtain equal resolution in photocopies of all types of documents.

To overcome this disadvantage, it has been known to employ as the focussing means of the projection means a lens having a long focal length, and so increase the depth of field over which focus may be achieved. However, it has been found that even employment of such a lens does not ensure satisfactory resolution in photocopies of all types of documents, in addition to which there is the disadvantage that the projection means must be made larger if a lens having a long focal length is included therein.

In order to compensate for the difference of the focal lengths between the thin original documents and thick original documents, it has also been proposed, as disclosed in the U.S. Pat. No. 3,510,218 granted on May 5, 1970, to provide another passage for transferring the thin original documents in addition to the passage for transferring the thick original document, the former being arranged at a position higher than the latter by a length corresponding to the thickness of the carrier, resulting in the focal lengths of the optical paths in connection with the thin original documents and thick original documents being the same. However, this arrangement has disadvantages such that it often makes a trouble of sticking the thin original documents into the passage which is provided in a bending form running from the low position to the high position and requires production of the passage with high precision at high cost.

It is accordingly a principal object of this invention to provide a projection device permitting good resolution to be achieved both in photocopies of thin original documents and in photocopies of thick original documents in a dual-purpose photocopying machine.

It is another object of the invention to provide a projection device which permits employment of a lens having a short focal length or of a light transmission means formed by a bundle of optical fibers of graded refractive indexes, whereby the projection means may be made more compact.

In accomplishing these and other objects, there is provided according to the present invention a dua-purpose photocopying machine projection device in which the focussing means employed in a short focal-length lens or a light transmission element formed by a bundle of optical fibers of graded refractive indexes, either of which is small and so contributes to reducing the size of the projection means, and is positioned to focus the image of a thin original document onto the peripheral surface of photosensitive drum, thus guaranteeing good resolution in photocopies of thin original documents. The projection device also includes a transparent block which suitably has a high index of refraction, which when an opaque cover employed during production of photocopies of thin original documents is positioned over the exposure station, is held out of line with the optical path from the exposure station to the focussing means, but which is automatically inserted into this path when the opaque cover is removed and a transparent carrier is employed for carrying a thick original document to be photocopied. When in the optical path leading from the projection station to the focussing means, the transparent block compensates for the variation of optical path length resulting from employment of the transparent document carrier, whereby good resolution in photocopies of thick original documents is also achieved. It is to be noted that the movement of the transparent block is operated not only in connection with the positions of the opaque cover, but also in relation to a switch which changes the processes of the photocopying machine from the photocopying of thin original documents to the photocopying of thick original documents and vice versa.

A better understanding of the present invention may be had from the following full description thereof when read in reference to the attached drawings, in which like numbers refer to like parts, and FIG. 1 is a schematic drawing illustrating the principles of the invention;

Figure 1A:
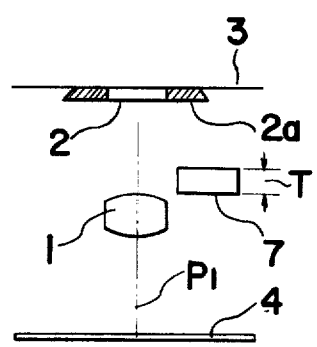

Referring first to FIG. 1A, a lens 1 is fixedly mounted between photosensitive material 4 and the exposure station 2, which is defined as an opening in a generally horizontal, opaque covering board means 2a. The mounting position and focal length of the lens 1 are such that the image of a portion of a thin original document 3 brought to the exposure station 2 is sharply focussed by the lens 1 on that portion of the photosensitive material 4 which is currently in line with the lens 1 and the exposure station 2. A transparent block, which is movable, is positioned on a plane which is nearer to the plane of the exposure station 2 than the lens 1, and is normally held out of line with the optical path P1 which leads from the exposure station 2, through the lens 1, to the photosensitive material 4.

Figure 1B:
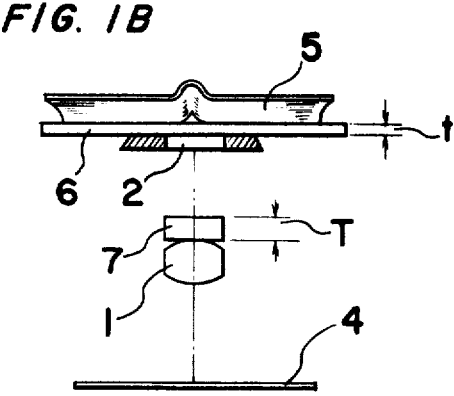

In FIG. 1B, when a thick original document 5 is photocopied, the document 5 is supported on a movable transparent carrier 6 made of glass or similar material and having a thickness $t$ and refractive index $n1$. Thus, the lower surface of the thick original document 5 is separated from the plane of the exposure station 2 by a distance equal to the thickness $t$ of the carrier 6, and the carrier 6 causes the length of the optical path P1 to be increased by a distance $t/n1$ as noted above. In other words, there is deviation of the image-wise light reflected from the document 5 and incident on the upper surface of the carrier 6. In the means of the invention this deviation is compensated for by moving the transparent block 7 to between the lens 1 and exposure station 2 when a thick original document is copied.

Presuming that the transparent block 7 has a thickness T and that its refractive index is $n2$, requisite compensation is achieved if the following formula is established;

$$\frac{t}{n1} = T - \frac{T}{n2} \quad (1)$$

The thickness T of the transparent block 7 should therefore be obtained by the following formula;

$$T = \frac{n2}{n1(n2 - 1)} \cdot t \quad (2)$$

If, for example, both the carrier 6 and the block 7 are made of glass having a refractive index 1.5, placing an optical block 7 having a thickness $T = 2t$ in the optical path P1 when a thick original document 5 is copied ensures that the image of the document 5 is correctly focussed on the photosensitive material 4.

Because deviation caused by the transparent carrier 6 is corrected by the transparent block 7, in the projection means of the invention there is no need to employ a lens having a long focal length and required to maintain focus over a particular depth of field, but there may be employed a lens which has a short focal length and is precisely positioned to permit focussing of the imagewise light reflected from documents positioned on an exact plane.

Figure 2:
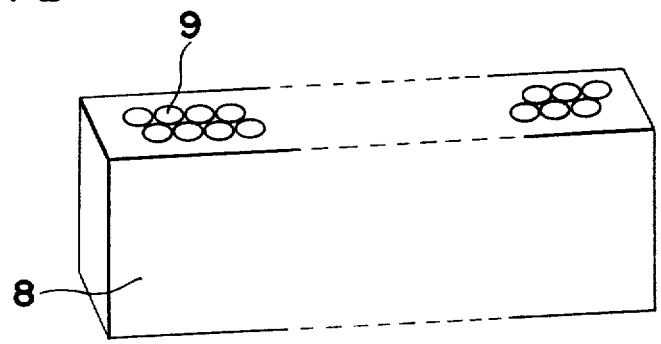
FIG. 2 is a perspective view of a light transmission element formed by a bundle of optical fibers of graded refractive indexes employable in the means of the invention.

Alternatively, it is possible to employ as the focussing lens means a fiber-bundle light transmission element 8, which, as shown in FIG. 2, consists of a plurality of light transmission fibers 9 of graded refractive indexes held straight and in a parallel array by a resin bonder or similar material. Such an element 8 has the advantage that it is not subject to edge effects, i.e., there is no lessening of the amount of light transmitted or lowering of the power of resolution near peripheral portions of the element 8, and for this reason such transmission elements have recently come to be used in photocopying machines.

Figure 3:
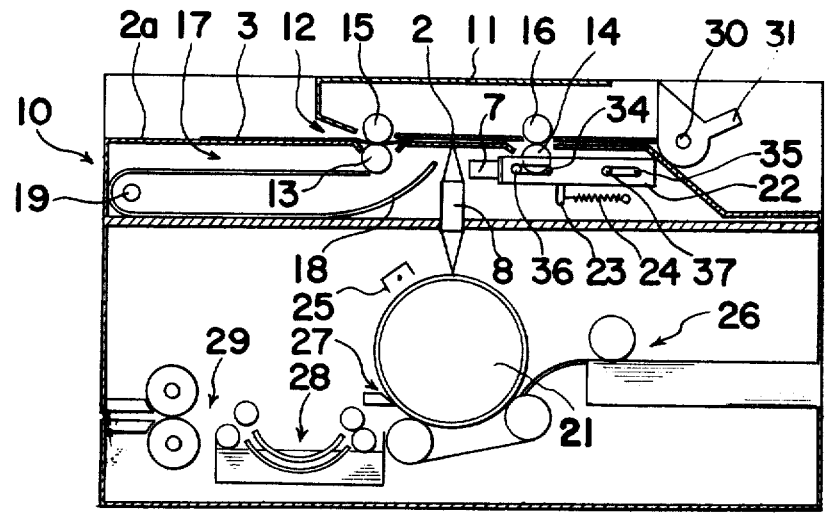
FIG. 3 is a cross-sectional view of a photocopying machine incorporating the projection device of the invention and currently employed to produce a photocopy of a thin orginal document.
Figure 4:
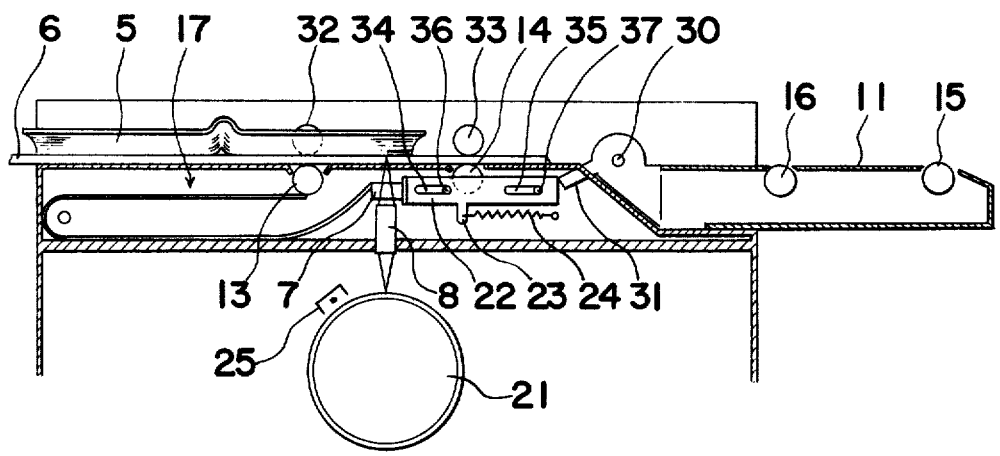
FIG. 4 is a cross-sectional view of the photocopying machine of FIG. 3 currently employed to produce a photocopy of a thick original document.
Figure 5:
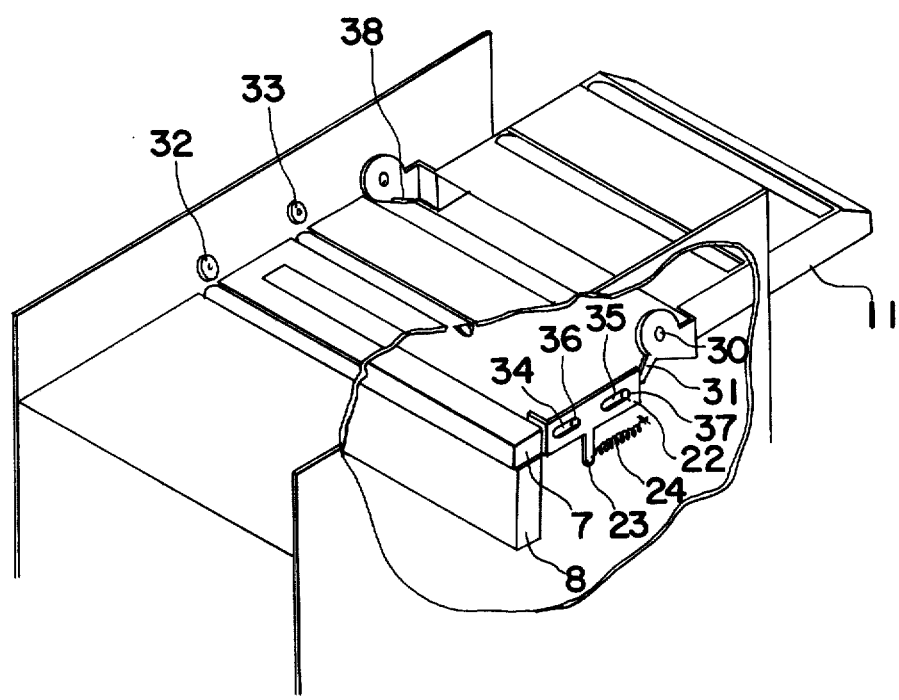
FIG. 5 is a perspective view, partially in section, of the photocopying machine of FIG. 4.

Reference is now had to FIGS. 3, 4 and 5 which show an example of the incorporation of the means of the invention in a photocopying machine wherein original documents are moved during the photocopying process.

In FIG. 3, on an upper surface of the main frame 10 of the photocopying machine there is provided a generally rectangular, box-like, opaque cover 11, which is pivotally mounted at one end thereof, which is the right-hand end thereof as seen in the drawing and is fixed to a shaft 30 which is rotatably mounted in upper side wall portions of the main housing 10. On opposite end portions of the shaft 30 there are fixedly mounted actuator elements 31. Each of the actuator elements 31, whose function is described in greater detail below, has a rounded portion which normally, i.e., when the cover 11 is closed, is close to the outer surface of the above-mentioned opaque covering board means 2a and a projecting actuator lever portion which when the actuator 31 is in a normal position is held in a neutral position, out of contact with other photocopying machine elements. Between the lower end of the sidewall at the opposite end of the cover 11 and the covering board means 2a which is fixed and extends over the upper portion of the main frame 10 below the cover 11, there is defined an inlet opening 12 through which a thin original document 3 may be supplied towards the exposure station 2 defined in the covering board means 2a.

Upon initial introduction of the thin original document 3 into the inlet opening 12 the leading edge portion thereof is engaged by a drive roll 13 and a follower roll 15, whose junction is level with the upper surface of the covering board means 2a. The drive roll 13 has an upper peripheral portion extending through an opening defined in the board means 2a and is caused to rotate upon actuation of an external start switch or similar means, not shown, which also causes actuation of other elements in the photocopying machine. The follower roll 15 is rotatably supported by side-walls, not shown, of the cover 11, and has a lower peripheral portion extending through an opening in the lower wall of the cover 11, to slightly below the lower surface of the cover 11 lower wall. In the opposite side portion of the photocopying machine, not shown, there is provided another drive roll 13 and follower roll 15. Upon actuation of the drive roll 13, the thin original document 3 is moved by the rolls 13 and 15 to and past the exposure station 2 and then into engagement with a similarly mounted pair of drive roll 14 and follower roll 16, which draw the document 3 from the exposure station 2 and guide it to an exit tray not shown.

That portion of the original document 3 which is at the exposure station 2 is illuminated from below by an illumination unit 17, which comprises a reflector 18 and a light source 19, and is provided below the level of the exposure station 2 and to the left thereof as seen in the drawing. The reflector 18 defines a flat upper surface and a lower surface which is shaped to form a quadratic curve, whereby light from the light source 19, which is located near to a closed end portion of the reflector 18, may be concentrated at the open end portion of the reflector 18, which is between the upper and lower surfaces of the reflector 18 adjacent to the exposure station 2. Image-wise light reflected from the portion of the original document 3 which is illuminated by the illumination unit 17 is focussed by a focussing means, for example, a fiber-bundle light transmission element 8, onto that portion of the peripheral surface of a rotatory drum which is currently at a projection station in line with the exposure station 2 and light transmission element 8.

The peripheral surface of the drum 21 is made of an electrophotosensitive material and each portion thereof is charged by a charging unit 25 prior to arrival thereof at the projection station, whereby electrostatic images of successive portions of the original document 3 may be formed on successive peripheral portions of the drum 21. The image-carrying portions of the drum 21 periphery are arranged in a electrostatic pattern corresponding to the image of the original document 3. This image is transferred onto a sheet of copy paper which is supplied by suitable transport means from a copy paper supply 26, brought into suitable pressure contact with the image-carrying portion of the periphery of the drum 21 by a transfer roll and belt assembly, then stripped from the drum 21 by stripping means 27, passed successively through a developing station 28 and a heat fusing station 29 and forwarded to the exterior of the photocopying machine.

Still referring to FIG. 3, just below the covering board means 2a and to the right of the light transmission element 8 as seen in the drawing, there is provided a slidable holder means 22 in each opposite side wall of which there is defined a pair of aligned elliptical slots 34 and 35, the major axes of the slots 34 and 35 being disposed horizontally. Pins 36 and 37 which are fixedly mounted in pairs in opposite side walls of the main housing 10 extend into the slots 34 and 35, respectively, and permit the holder means 22 to slide in left and right movement as seen in the drawing, but do not permit upward or downward movement thereof. A transparent block 7 such as described above is fixedly held by the left-hand portion of the holder means 22 and may be carried thereby to a leftmost position in which it is between the light transmission element 8 and the exposure station 2 or to a rightmost position in which it is out of line with the optical path P1 leading from the exposure station to the periphery of the drum 21. Normally, the holder means 22 and transparent block 7 are held in a rightmost position due to the force exerted by one or more compression springs 24 each having one end fixed to a portion of the main housing 10 and the other end attached to a downward projection 23 which is integrally attached to the holder means 22. Normally, therefore, the image-wise light may pass unhindered from the exposure station 2 to the light transmission element 8, and be focussed thereby onto the drum 21.

Referring now to FIGS. 4 and 5, when it is required to photocopy a thick original document 5, the cover 11 is pivoted 180° about the shaft 30, clockwise as seen in FIG. 4, whereby the follower rolls 15 and 16 are moved out of contact with the drive rolls 13 and 14, and the transparent document carrier 6 is brought into position above the covering board means 2a. The lower surface of the document carrier 6 contacts the drive rolls 13 and 14, and the carrier 6 is held pressed to the drive rolls 13 and 14 by follower rolls 32 and 33 which are provided in pairs on opposite upper side-wall portions of the main housing 10 and contact side portions only of the carrier 6, so permitting a thick original document 5 to be placed on the central portion of the carrier 6. When the cover 11 is thus pivoted 180°, the actuator elements 31 fixedly attached to opposite ends of the pivot shaft 30 of the cover 11 are also pivoted 180°, whereby the actuator elements 31 are moved through gap portions 38 defined in opposite side walls of the main housing 10, are brought into contact with opposite end portions of the transparent block holder means 22, and push the holder means 22 into the abovedescribed leftmost position wherein the transparent block 7 is held between the exposure station 2 and the light transmission element 8.

Thus, without any special action being required to be performed by the user of the photocopying machine, the projection means of the invention, while having a very simple construction, effects compensation for alteration of optical path length caused by a carrier means which must be employed when thick original documents are employed, and so ensures good resolution in production of photocopies of all types of documents.

In tests conducted using a photocopying machine which had the same general construction as that shown in FIG. 2 but which was not equipped with an transparent block 7 and associated elements, it was found that by suitable selection and positioning of a focussing means in the projection means of the photocopying machine it was possible to obtain photocopies having a resolution of 10 lines/mm in photocopying thin original documents, but that when thick original documents were photocopied resolution of photocopies dropped to 3 – 3.5 lines/mm. In contrast to this, in a photocopying machine incorporating the means of the invention as shown in FIGS. 2 and 3, the same resolution was achieved in photocopies of thin original documents and resolution achieved in photocopies of thick original documents was 9 – 10 lines/mm, which is a marked improvement over the resolution achievable by conventional projection means, and for most practical purposes may be considered equivalent to resolution of photocopies of thin original documents.

Although the present invention has been fully described by way of example with reference to the attached drawing, it is to be noted that various changes and modifications are apparent to those skilled in the art. Therefore, unless such changes and modifications depart from the scope of the present invention, they should be construed as included therein.

What is claimed is:

1. In a photocopying machine which permits reproduction both of thick original documents and of thin original documents, wherein a thin original document is transported past an exposure station by a transport means during the photocopying process, and a thick original document is supported on a transparent carrier means and carried along a line parallel to the plane of the exposure station during the photocopying process, the thick original document being separated from the exposure station by a distance equal to the thickness of the carrier means, a projection device comprising:

an exposure station;

a transport means including a pair of roll means provided at both sides of said exposure station for transporting the thin original document, and a guide means provided to form a passage for transporting the thin original documents facing said exposure station and roll means, said guide means being arranged to move away from said exposure station during the photocopying process of a thick original document;

a transport carrier means to be carried by said pair of roll means during the photocopying process of a thick original document for supporting the thick original document;

an illumination means actuable to illuminate the original document portions brought to or in line with said exposure station;

a focussing means provided to direct the image-wise light from said original document portions illuminated by said illumination means onto the outer surface of the photosensitive means of the photocopying machine which is able to form a latent image of the original documents upon being struck by the image-wise light coming from the original document portions;

a transparent block having a thickness T obtained by the following formula $$T = \frac{n2}{n1(n2 - 1)} \cdot t$$

wherein $t$ is the thickness of said transparent carrier means, and $n1$ and $n2$ are the refractive indexes of said transparent carrier means and transparent block, respectively, said transparent block being movable to an interposed position between said focussing means and said exposure station during the photocopying process of a thick original document in order to compensate for the deviation of the image-wise light caused by said transparent carrier means; and an operating means actuable to bring said transparent block into the interposed position in connection with the operation of switching the photocopying process from the thin original document to the thick original document.

2. A projection device for a photocopying machine as defined in claim 1, wherein said transparent block is made of the same material as that of said transparent carrier means.

3. A projection device for a photocopying machine as defined in claim 1, wherein said focussing means is an image transmitter formed by a bundle of optical fibers of graded refractive indexes.

4. A projection device for a photocopying machine as defined in claim 1, wherein said focussing means is a lens having a short focal length.

5. A projection device for a photocopying machine as defined in claim 1, wherein said transparent block is held on a holder means which is movable in a direction perpendicular to the light axis of said focussing means.

6. A projection device for a photocopying machine as defined in claim 1, wherein said operating means is associated with said guide means for inserting said transparent block into the light axis of said focussing means in connection with the removal of said guide means from said exposure station.

7. A projection device for a photocopying machine as defined in claim 6, wherein said guide means includes a cam for causing said operating means to insert said transparent block into the light axis of said focussing means.

8. In a photocopying machine which permits reproduction both of thick original documents and of thin original documents, wherein a thin original document is transported past an exposure station by transport rolls and associated roll means during the photocopying process, and a thick original document is supported on a transparent carrier means and carried along a line parallel to the plane of the exposure station during the photocopying process, the thick original document being separated from the exposure station by a distance equal to the thickness of the carrier means, and which has photosensitive means for forming a latent image of the original documents upon being struck by the image-wise light coming from the original documents, illumination means actuable to illuminate the original document portions brought to or in line with the exposure station, opaque cover means movable to a closed position wherein the cover means prevents the impingement of external light on the exposure station and to an open position wherein the cover means permits free movement of the carrier means, and a focussing means which is located between the exposure station and the photosensitive means and may direct the image-wise light from the original documents onto the photosensitive means, a projection device comprising, a transparent block which when interposed between the focussing means and the exposure station may compensate for the deviation of the image-wise light caused by the carrier means, a holder means which holds said transparent block, and is movable to a first position wherein said transparent block held thereby is out of line with the optical path leading from the exposure station to the focussing means and to a second position wherein said transparent block is interposed between the exposure station and the focussing means, a first positioning means normally holding said holder means in said first position, and a normally unactuated second positioning means which is connected to the cover means and which when the cover means is moved to the open position is actuated to move said holder means to said second position.

9. Photocopying machine projection means as claimed in claim 8, wherein said holder means has slots defined therein, the projection means further comprises a plurality of pin elements fixedly attached to the photocopying machine fixed wall portions and extending into said slots defined in said holder means for slidably supporting and guiding said holder means, said first positioning means is constituted by a spring means attached at opposite ends to said holder means and fixed wall portions of said photocopying machine, and said second positioning means is constituted by lever elements which are held out of contact with said holder means when the cover means is in the closed position and which when the cover means is moved to the open position are moved into contact with said holder means and exert thereon a force which is opposed to and overcomes the force exerted on said holder means by said spring means.

10. Photocopying machine projection means as claimed in claim 9, further comprising a shaft which is rotatably mounted in fixed wall portions of the photocopying machine for fixedly mounting the cover means thereon and permitting pivotal movement of the cover means to and from the open and closed positions, and for fixedly attaching said level elements to said shaft.

* * * * *